(12) United States Patent
Bergman et al.

(10) Patent No.: US 6,407,702 B1
(45) Date of Patent: Jun. 18, 2002

(54) METHOD AND SYSTEM FOR OBTAINING DIRECTION OF AN ELECTROMAGNETIC WAVE

(75) Inventors: Jan Bergman; Tobia Carozzi; Roger Karlsson, all of Uppsala (SE)

(73) Assignee: Red Snake Radio Technology AB, Stockholm (SE)

(*) Notice: Subject to any disclaimer, the term of this patent is extended or adjusted under 35 U.S.C. 154(b) by 0 days.

(21) Appl. No.: 09/719,749
(22) PCT Filed: Jun. 11, 1999
(86) PCT No.: PCT/SE99/01036
§ 371 (c)(1),
(2), (4) Date: Feb. 26, 2001
(87) PCT Pub. No.: WO99/66341
PCT Pub. Date: Dec. 23, 1999

(30) Foreign Application Priority Data

Jun. 15, 1998 (SE) .............................................. 9802126

(51) Int. Cl.[7] .............................................. G01S 3/46
(52) U.S. Cl. .................... 342/364; 342/366; 342/417; 342/445
(58) Field of Search .................... 342/188, 361–366, 342/417, 445

(56) References Cited

U.S. PATENT DOCUMENTS

| | | | | | |
|---|---|---|---|---|---|
| 4,626,859 A | * | 12/1986 | Stansfield | .................... | 342/445 |
| 4,639,733 A | * | 1/1987 | King et al. | .................. | 342/417 |
| 5,323,166 A | * | 6/1994 | Nguyen | ....................... | 342/417 |

* cited by examiner

Primary Examiner—Thomas H. Tarcza
Assistant Examiner—Fred H Mull
(74) Attorney, Agent, or Firm—Young & Thompson

(57) ABSTRACT

A method and a system are disclosed which utilize the polarization properties of electromagnetic fields for a determination of the direction to the source of the electromagnetic radiation. The method and system primarily use a particular antenna device with is associated receiver means for obtaining a wave field measurement Assuming separate frequencies, the present method and system also make it possible to distinguish between several sources and register their separate polarizations simultaneously. At least three electric antennas, or three magnetic antennas, are used to measure the wave field. The registered field components need not be orthogonal to each other. The measured wave field is processed in accordance to predetermined formulae so that the propagation direction and other polarization characteristics, such as the spectral intensity I and the spectral degree of circular polarization rc, are derived. Furthermore the measurements need not be from more than one point in space. In this respect a one-point measurement is considered to be such that all antennas are well within a sphere of a wavelength scale.

10 Claims, 4 Drawing Sheets

METHOD AND SYSTEM FOR OBTAINING DIRECTION OF AN ELECTROMAGNETIC WAVE

FIELD OF THE INVENTION

This invention involves antennas and relates to measurements of electromagnetic wave field characterizations. Specifically, it relates to a method and a system dealing with determination of wave polarization and direction of wave propagation for arbitrary frequencies.

BACKGROUND OF THE INVENTION

Many man-made electronic applications generate radio-frequency waves. Within the radio frequency spectrum there are nowadays numerous sources, both man-made and naturally occurring. The man-made sources may be intentional, for example normal communication systems, or they may be unintentional, for example electromagnetic contamination (EMC). Often the exact position of the source is not known and in such cases it would be of great value to know the direction to the source and thereby also be able to estimate the position of the source.

In the past several techniques have been deployed to identify the location of the source. Methods like "high-gain" antenna bearing, interferometry with two or more receivers separated by a distance that scales with the wavelength, and triangulation are in use today.

SUMMARY OF THE INVENTION

The present invention utilizes the polarization properties of electromagnetic fields to determine the direction to the source. Furthermore the measurements need not be from more than one point in space. In this respect a one-point measurement is considered to be such that all antennas are well within a sphere of a wavelength scale.

Assuming separate frequencies, the present invention also makes it possible to distinguish between several sources and register their separate polarization simultaneously. At least three electric antennas, or three magnetic antennas, are used to measure the wave field. The antennas are arranged such that three spatial components of the wave field can be registered. The registered field components need not be a priori orthogonal to each other. The measured wave field is processed in accordance to predetermined formulae so that the propagation direction and other polarization characteristics, such as the spectral intensity and the spectral degree of circular polarization, are derived.

The present invention is set forth by the independent claims 1 and 6 and different embodiments are set forth by the dependent claims 2–5 and 7–10.

BRIEF DESCRIPTION OF THE DRAWINGS

The invention will be explained in greater detail with reference to an example of an illustrative embodiment demonstrated in the drawings, in which.

DETAILED DESCRIPTION OF THE INVENTION

Theoretical Analysis

Figure 1:
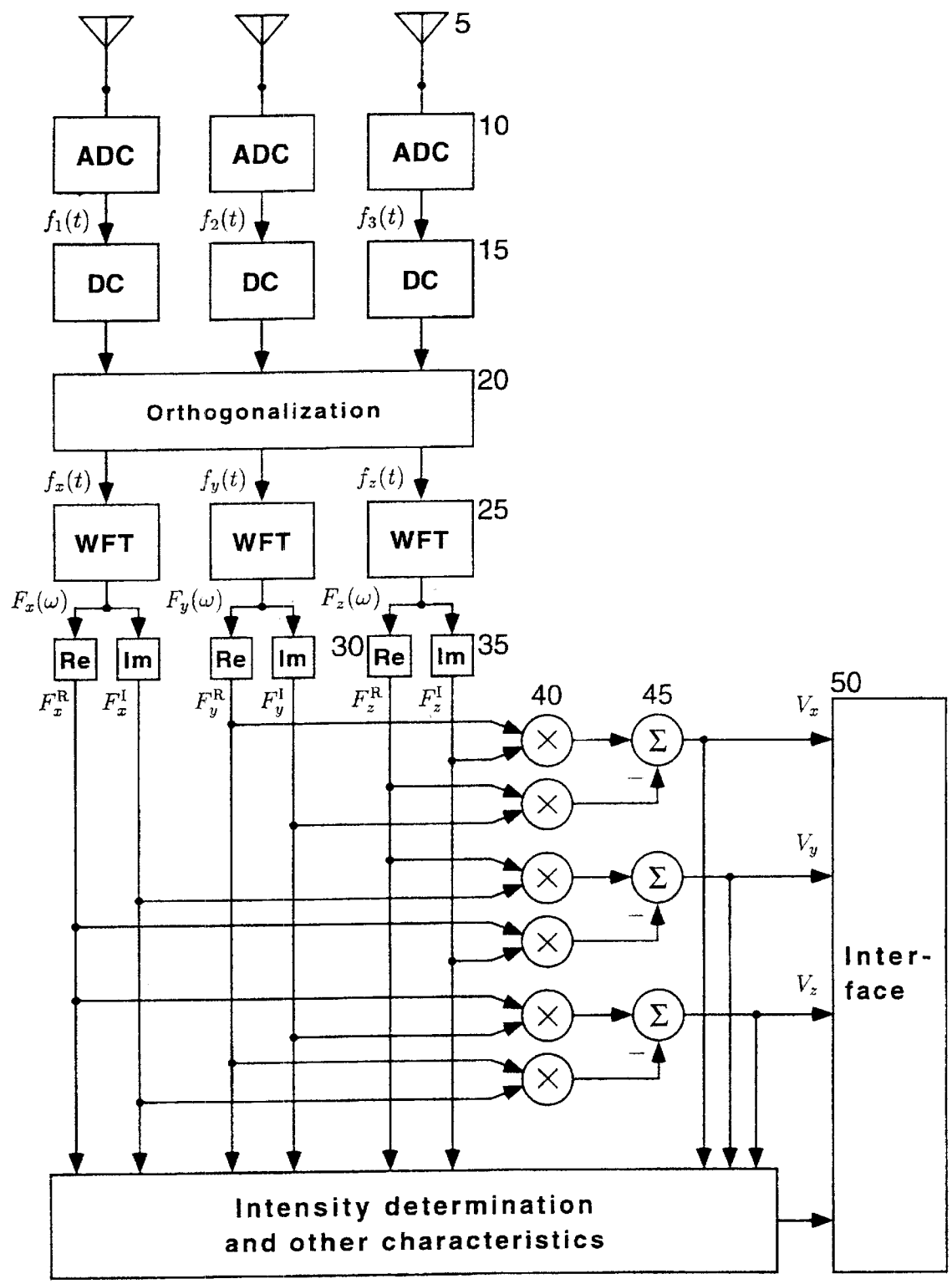
FIG. 1 shows a preferred embodiment for a radio receiver, which implements the direction finding method explained in the text.

The invention utilizes the polarization properties of electromagnetic radiation to determine propagation direction. Three orthogonal components of the electric or the magnetic field, are required in the analysis.

One of the simplest types of antenna arrangements is three mutually perpendicular dipole antennas for measuring the electric field or three mutually perpendicular coils for measuring the magnetic field. Other antenna arrangements can be used, which is obvious for persons skilled in the art of antenna engineering.

In case the registered spatial components of the time-dependent field f(t) are not orthogonal to each other, they need first be orthogonalized. We denote the spatially orthogonalized components of the wave field, f(t), by $f_x(t)$, $f_y(t)$, and $f_z(t)$. In one wave period, the field vector f(t) sweeps out an ellipse, which describes the state of polarization. This ellipse is called the polarization ellipse. Since we wish to distinguish between different frequencies, a temporal transform of the field will be used. The transform is of the Cohen class of transformations [L. Cohen, "Generalized phase-space distribution functions", *Jour. Math. Phys.*, vol.7, pp.781–786, 1966], which includes for example the Windowed Fourier Transform (WFT) and the Wavelet transform. As an example, we will use the WFT in what follows. We denote the transform of the field by F(ω), with components $F_x(\omega)$, $F_y(\omega)$, and $F_z(\omega)$, or simply $F_x$, $F_y$, and $F_z$, respectively.

The spectrum field is complex valued and can be written as $F=F^R+iF^I$, where $F^R$ is the real part and $F^I$ is the imaginary part of the spectrum field.

The field vector F for a transverse electromagnetic wave lies in the plane transverse to the direction of propagation. By taking the Hermite conjugate of F and multiplying it by the imaginary unit, i, we obtain the vector $iF^t$. The vector $iF^t$ lies also in the transverse plane, but ahead of F in phase. Together these two vectors form a plane, which is perpendicular to the direction of propagation. A vector which is always parallel to the direction of propagation is therefore given by $iF \times F^t$. We call this vector V, which we define by $$V = iF \times F^t = i(F^R + iF^I) \times (F^R - iF^I) = 2F^R \times F^I \quad (1)$$

or in component form:

$$\begin{pmatrix} V_x \\ V_y \\ V_z \end{pmatrix} = 2F^R \times F^I = 2\begin{pmatrix} F_y^R F_z^I - F_z^R F_y^I \\ F_z^R F_x^I - F_x^R F_z^I \\ F_x^R F_y^I - F_y^R F_x^I \end{pmatrix} \quad (2)$$

The vector V can be shown to be perpendicular to the field, $V \perp F$, i.e., $V \cdot F = 0$.

The direction in which the polarization ellipse is traced out determines if the helicity of the field is positive or negative. In a right-handed reference system, positive helicity means that the vector V points in the same direction as the propagation direction, negative helicity means that the vector V points in the opposite direction to the direction of propagation. The helicity cannot be determined a prior without simultaneously measuring both the electric and magnetic fields, indicating two possible propagation directions. In many cases, some additional information is known about the wave field so that one of the two possible propagation directions can be excluded.

The existence of a signal at the receiver input is marked by an intensity at a certain frequency band. Therefore we also need to measure the spectral intensity of the wave field. Also the spectral degree of circular polarization can be determined. The spectral intensity, I, of the wave field is given by $$I=|F_x|^2+|F_y|^2+|F_z|^2. \qquad (8)$$

For the j:th field component, j=x, y, z, we have $$|F_j|^2=F_jF_j^*=(F_j^R+iF_j^I)(F_j^R-iF_j^I)=(F_j^R)^2+(F_j^I)^2, \qquad (9)$$

where * symbolizes complex conjugation. The intensity is thus written $$I=(F_1^R)^2+(F_1^I)^2+(F_2^R)^2+(F_2^I)^2+(F_3^R)^2+(F_3^I)^2 \qquad (10)$$

The spectral degree of circular polarization is given by $$r_C = \frac{|V|}{I} = \frac{1}{I}\sqrt{V_1^2+V_2^2+V_3^2} \qquad (11)$$

which indicates how circularly polarized the measured wave field is. The spectral degree of circular polarization does, according to this definition, vary between zero and one. The spectral degree of linear polarization, $r_L$, is defined by $$r_L=1-r_C \qquad (12)$$

For a person skilled in the art it will also, apart from the four polarization parameters I and V, be possible to determine two other polarization parameters and the coherency between different components of the electromagnetic field. The two other polarization parameters can be interpreted as the two angles which determine the direction of the semi major axis of the polarization ellipse (for instance see R. Karlsson, "Three-dimensional spectral Stokes parameters", *Master thesis,* UPTEC 97 069E, 1998).

Applications of the Present Invention

The main application of the present invention is to give a complete description of measured three dimensional (3D) time-dependent electromagnetic fields, in terms of their polarization characteristics.

The most important characteristics are given by the four polarization parameters V and I, which are defined by Equations (1) and (10) respectively. The vector V indicates two possible wave propagation directions. This means that there exists a 180 degrees ambiguity in the determination of direction to a radiating source. However, in most practical applications this ambiguity can be resolved without simultaneously measuring both the electric and magnetic wave fields.

If the source is moving relative to the receiver, the 180 degrees ambiguity can be resolved by means of conventional Doppler techniques. This is often the case when space- or airborne measurements are considered, where the source often can be assumed to be stationary relative to the moving receiver.

When ground based measurements are considered, there are two contributions to the registered wave field at the antenna input. One contribution is from the direct wave field and the other is from the wave field reflected from the ground. The influence caused by ground reflection can, for a person skilled in the arts of electrodynamics, complex analysis and linear algebra, be resolved analytically if the ground is assumed to be a good conductor, i.e. $\sigma/\omega\epsilon \gg 1$, where $\sigma$ is the conductivity and $\epsilon$ is the permittivity of the ground and $\omega$ is the angular frequency of the wave.

By analysis of different frequency components of the field spectrum, $F(\omega)$, a radio receiver which implements the methods described in the theory, has the possibility to simultaneously distinguish between multiple, non-identical, sources. One practical application of such a radio receiver for microwaves, which are of the order of 1 cm, is in the field of digital mobile telephony. When a subscriber, i.e., a mobile telephone, attempts to make a connection, it is assigned a unique frequency from the corresponding base station in its cell. Thus, during connections, each telephone acts as a unique radio source in its cell. If the client is moving to a neighboring cell during a connection it will be assigned a new frequency from the new, corresponding, base station. The change of base stations is determined by a threshold level of the signal-strength. If the cells have small overlappings or if the traffic is low there are usually no problems using this strategy. If on the other hand, the cells have large overlapings and the traffic is high, severe problems such as drop-outs during a connection or even cancellation of a connection might occur. This is often the case in densely populated regions where, due to the limitations in bandwidth and the desire to have a good over-all coverage, the cells are correspondingly small. In order to optimize the utilization of the base stations and to enhance the security of the connections, it is desired to know where, in a cell, the subscribers are situated. A radio receiver for mobile telephony which implements the direction finding method described in the theory according to the present invention will be able to determine the direction to, and thus the approximate location, of multiple subscribers in a cell.

It is obvious for a person skilled in the art of radio interferometry techniques, that several radio receivers, which implements the methods described in the present application, may be combined. If the distances between the radio receivers is much larger than one wavelength, conventional triangulation techniques (R. C. Johnson and H. Jasik, "Antenna Engineering Handbook", Second ed., Chapter 39, Section 3, pp 6–12, MacGraw-Hill, New York, 1984) can be employed to enhance the accuracy of the measurements, specifically the determination of the direction to the source. If the radio receivers are stacked close together, so that the distance between two receivers are much less than one wavelength, an antenna array can be formed (for instance see C. A. Balanis, "Antenna Theory: analysis and design", Second ed., Chapter 6, page 249, John Wiley & Sons, New York, 1997). For such a system, the sensitivity as well as the accuracy of the measurements can be increased by means of conventional radio interferometry techniques (Y. T Lo and S. W. Lee, Antenna Handbook, Vol.3, Chapter 25, pp 21–23, Chapman & Hall, New York, 1993).

It is also possible, that the employed algorithm can be inverted for the implementation of a radio transmitter, i.e., by specification of the various polarization parameters, a radio wave with certain polarization characteristics, such as the degree of circular polarization in a predetermined direction, could be transmitted. The antennas would then act as an electronically steerable crossed dipole. If such a radio transmitter is synchronized in time with a radio receiver, which implements the methods described here, and the antennas are shared, the present invention can be used to implement a monostatic radar. If the transmitter and the receiver are synchronized, but use different but equivalent antenna arrangements, the radar is bistatic. The radio receiver can also be combined with a conventional, external, radio transmitter, to form a bistatic radar.

One practical application of the monostatic radar is to perform ground penetrating radar (GPR) measurements from spacecraft ("Technical note on Trade-off and Baseline Concept: Planetary Into-the-ground Radar and Altimeter", Performed under ESTEC Contract No: 11537/95/NL/NB, September 1996) or aircraft. When GPR measurements are considered, the wavelength of the transmitted signal is of the order of several hundred meters. Apart from conventional GPR techniques such as the synthetic aperture radar (SAR) technique, the known polarization characteristics of the transmitted field, together with the measured polarization characteristics of the received signal, could be used to improve the interpretation of the radar echo.

If radar measurements are considered, an antenna array of radio transmitters, which utilizes the inverted algorithm, can be formed. In combination with conventional antenna phasing techniques the over-all performance of the transmitting antenna array would be enhanced compared to conventional systems. Thus, implementations of monostatic as well as bistatic radar systems are possible.

Description of a Preferred Embodiment

A preferred embodiment of a radio receiver is shown in FIG. 1. In this case, the antenna devices 5 register the three spatial components of a time-dependent electric or magnetic vector field, f(t). The components of the field are denoted by $f_1(t)$, $f_2(t)$, and $f_3(t)$. Each component of the field is digitized by a respective Analog-to-Digital Converter (ADC) 10. To fully utilize the bandwidth of a radio receiver, the signal is usually down-converted to a baseband frequency. In the preferred embodiment, each field component is down-converted digitally by the Down Converters (DC) 15. In circumstances where the interesting frequency is at least higher than half the sampling rate of the ADC, analog down-conversion has to be used. In that case, the order of the ADC and the DC is interchanged. For low frequency measurements, the DC stage can be left out.

If the three spatial components of the field f(t) registered at the antenna devices 5 are not a priori orthogonal to each other, which is the general case if not a special arrangement of antenna configurations are utilized, e.g., three mutually perpendicular dipole antennas, a spatial orthogonalization 20 is required. In the preferred embodiment, the orthogonalization 20 is performed after the digital down-conversion 15 but can in principle be performed directly after the ADC which anyhow is the case when analog or no down-conversion is used. The three spatially orthogonalized components of the field f(t) are denoted by $f_x(t)$, $f_y(t)$, and $f_z(t)$.

A discrete transformation algorithm is then applied to the wave-form data to obtain the spectrum field data, $F(\omega)$. In the preferred embodiment a Windowed Fourier Transform (WFT) algorithm 25 is employed. The three spatial components of the spectrum field data are denoted by $F_x(\omega)$, $F_y(\omega)$, and $F_z(\omega)$, or simply by $F_x$, $F_y$, and $F_z$, respectively.

Each component of the spectrum field, $F(\omega)$, is then separated into its real part $F_j^R$, 30 and its imaginary part $F_j^I$, 35, where the subscript, j=x,y,z, denotes the different components.

To determine the vector V defined by Equation (1), which is parallel to the direction of propagation, the spectrum field components are in pairs multiplied 40 and then summed 45 according to Equation (2). The three components of the obtained vector V is then transferred to an interface 50 indicated in FIG. 1.

Figure 2:
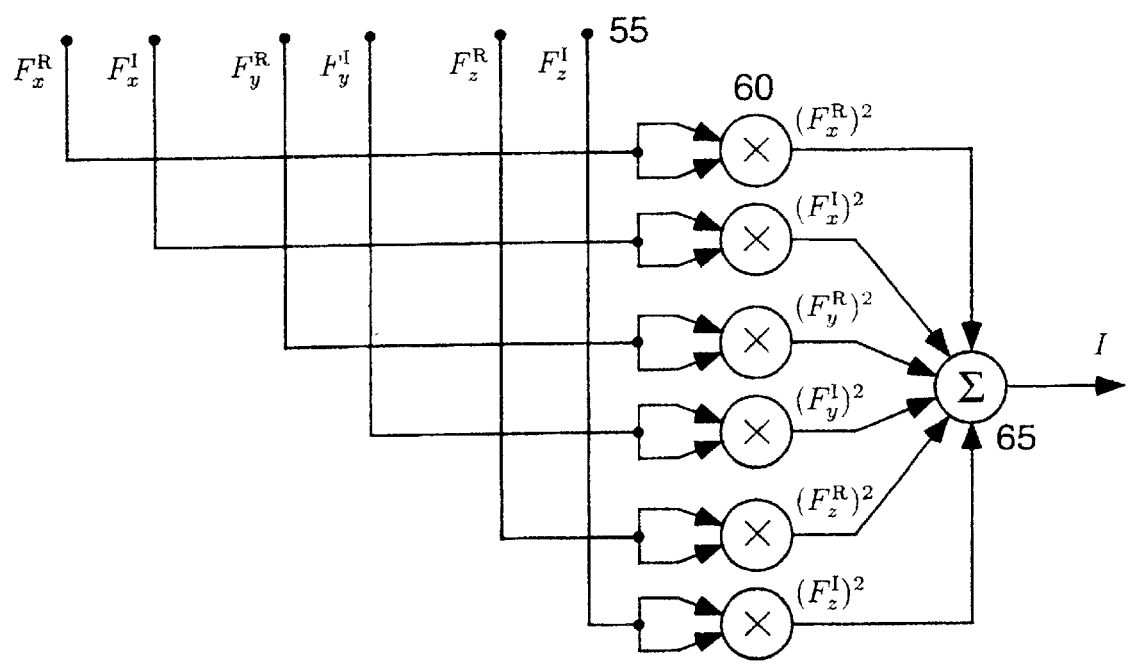
FIG. 2 illustrates the method for obtaining the spectral intensity in a preferred embodiment.

In FIG. 2, it is shown, according to the present method, how the spectral intensity, I, of the vector field f(t), is determined. From FIG. 1 the real parts 30 and imaginary parts 35 of the spectrum field $F(\omega)$, are given. Each of the six parameters 55 are squared 60 and then summed 65 according to Equation (10) and the spectral intensity is obtained. The spectral intensity is then transferred to the interface 50 indicated in FIG. 1.

Figure 3:
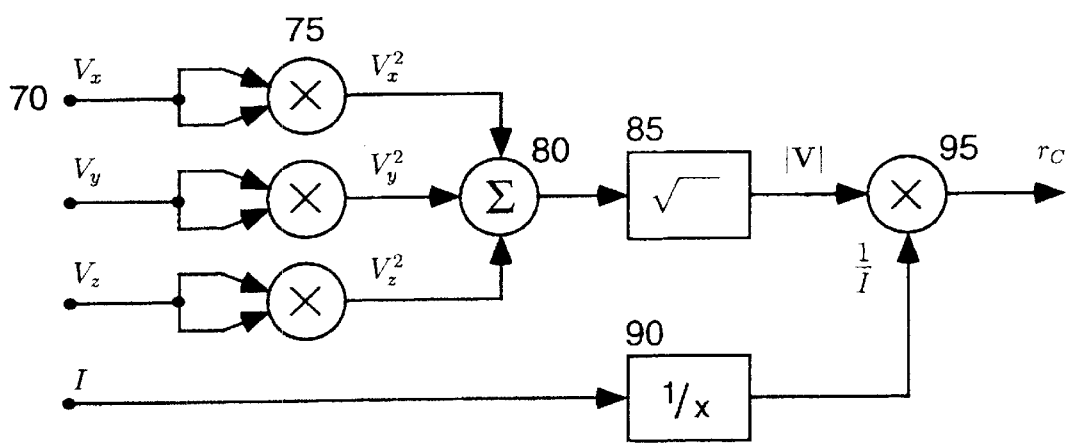
FIG. 3 describes how the degree of circular polarization is obtained in a preferred embodiment.

In FIG. 3, it is shown, according to the present method, how the spectral degree of circular polarization, rc, of the vector field f(t) is determined. The components of the vector V are given from FIG. 1 and in accordance with FIG. 2 is given the spectral intensity I 70. The components of V are first squared 75 and summed 80. The square root of the sum 80 is then taken 85 so that the absolute value, |V|, of V is obtained. The inverted value of the spectral intensity, 1/I, 90 is then multiplied by the absolute value |V| in accordance with Equation (11). The product of this multiplication is the spectral degree of circular polarization, rc, which is then transferred to the interface 50 indicated in FIG. 1.

In practical applications, it is convenient to express the direction of V, in terms of the polar angle θ and the azimuth angle φ of a spherical coordinate system. The vector V then has the same meaning as the radius vector. The components of V are then given by $$V_1 = |V| \sin\theta \cos\phi, \quad (3)$$

$$V_2 = |V| \sin\theta \sin\phi \quad (4)$$

$$V_3 = |V| \cos\theta \quad (5)$$

From these three Equations we can find the angles θ and φ.

$$\cos\theta = \frac{V_z}{|V|} = \frac{z}{\sqrt{V_x^2 + V_y^2 + V_z^2}} \quad (6)$$

$$\tan\phi = \frac{V_y}{V_x} \quad (7)$$

Thus these angles indicate the propagation direction in the antenna reference system.

The antennas used in the preferred embodiment can be either electric or magnetic. At least three electric or three magnetic antenna devices are required for registering three spatial components of the wave field. The antenna devices 5 are in the preferred embodiment equivalent. An antenna device may consist of different antenna configurations.

If electric antennas are considered, one of the simplest types of antenna configurations is the thin dipole antenna. A dipole antenna can be formed by connecting two monopole elements, thereby registering the signal by measuring the voltage between the two elements. The simplest type of such a dipole antenna is the straight dipole antenna, meaning that the two monopole elements are parallel and point in opposite direction and that the signal is registered by measuring the voltage at a common origin. Another type is the V-shaped dipole antenna, which is a generalization of the straight dipole antenna with the only extension that the two monopole elements need not be parallel.

Figure 4:
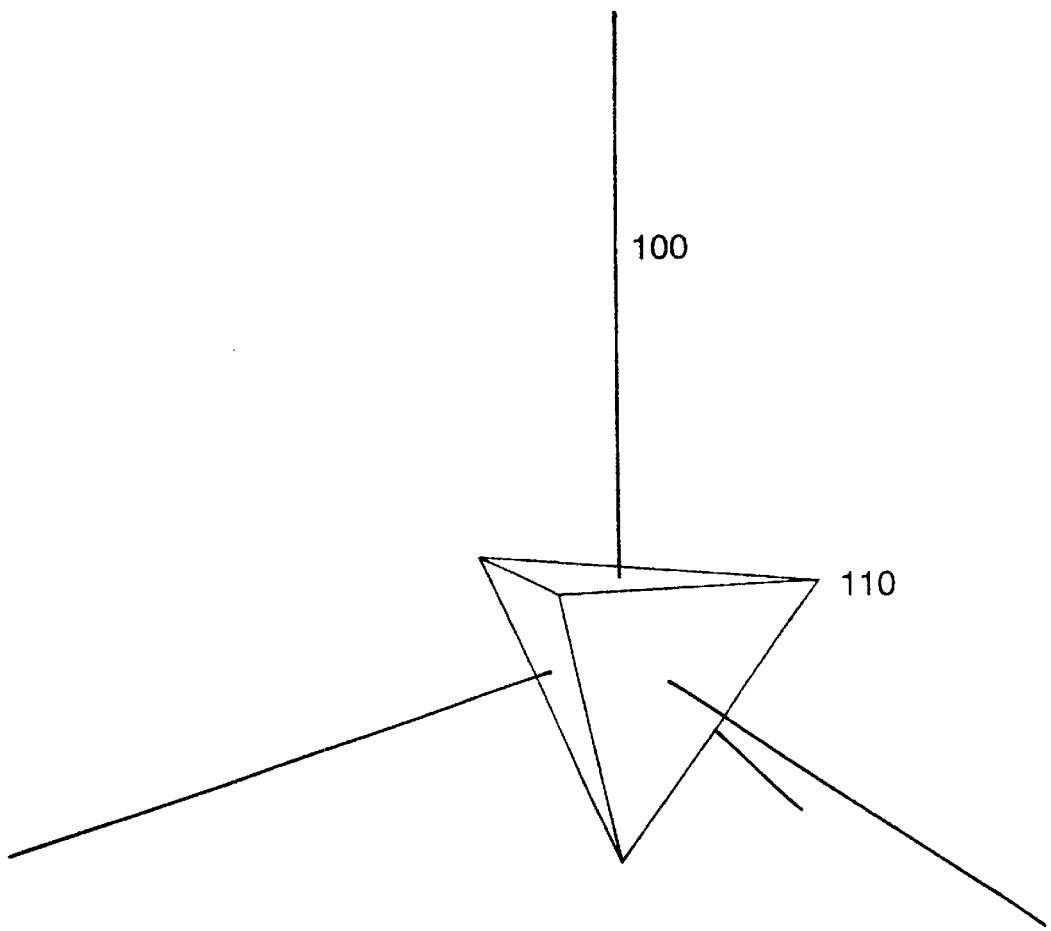
FIG. 4 shows an example of an antenna arrangement and a casing for a preferred embodiment.

There exists numerous of ways of arranging antenna configurations for measuring the three-dimensional (3D) wave field. One way is to form an arrangement consisting of three mutually perpendicular straight dipole antennas. An advantage of such an arrangement is that the spatial orthogonalization process 20 in the preferred embodiment can be left out. Another advantage is that each antenna device 5 is directly connected to the corresponding physical antenna meaning that any process for antenna selection or antenna switching is not necessary. Another arrangement is to use four monopole elements forming six possible V-shaped dipole antennas. This arrangement is used in the preferred embodiment where the four monopole elements 100 are mounted on the sides of the casing 110, which in the preferred embodiment is of the form of a regular tetrahedron according to FIG. 4. An advantage of this arrangement is that the number of needed monopole elements is minimized. The drawbacks are the need for a process to select or switch between the six possible V-shaped dipole antennas and the need for a spatial orthogonalization process 20.

In order to utilize as large a frequency range as possible there exists an implicit need to use dipole antennas, which are short compared to the wavelength. Short dipole antennas have both a flat frequency response curve and a flat frequency-to-phase dependence. If resonant antennas are used the usable bandwidth narrows considerably due to the steep phase-shift occurring close to the antenna resonance frequency. In this case it is in principle possible, which is obvious for a person skilled in the art of signal analysis, to calibrate the antenna devices. In practice though, this is not feasible due to the strong dependence of the many unknown variables involved.

If magnetic antennas are considered, the simplest type of antenna configuration is the magnetic dipole antenna. A magnetic dipole antenna is a small current loop in the form of a coil, registering the signal by measuring the current in the coil. The simplest, but not the only type of antenna arrangement, is three mutually perpendicular coils.

In case of short electric antennas, which present high impedance, essentially capacitive, the levels of the registered signals are low. Therefore, which is obvious for a person skilled in the art, it is necessary to arrange for impedance matching and also amplification of the signals before transferring the signals to the receiver means. In the preferred embodiment, impedance matching and amplification are performed by utilizing high impedance pre-amplifiers in a conventional manner. This is well known by a person skilled in the art and need not be further discussed in this context.

Among others the objects and advantages of the present invention are:

(a) The method according to the present invention gives the direction to and the polarization of a radiating source.

(b) The three-dimensional electromagnetic vector field measured according to the present invention is completely described in terms of certain, yet meaningful, polarization parameters.

(c) The scale size of a device utilizing the method and system according to the present invention does not increase with increasing wavelength. For HF and lower frequencies the invention is still contained in one module.

(d) All measurements made according to the present invention are virtually instantaneous (on the order of a source wave period). No rotors are necessary.

(e) It is possible to simultaneously distinguish between several sources.

(f) Data integrity and accuracy is guaranteed by maximum possible usage of digital technology.

It will be appreciated by those of ordinary skill in the art that the present invention can be embodied in many other specific forms without departing from the spirit or essential character thereof. The presently disclosed embodiment therefore is considered in all respects to be illustrative and not restrictive. The scope of the invention is indicated by the appended claims rather than the foregoing description, and all changes which come within the meaning and range of equivalents thereof are intended to be embodied therein.

What is claimed is:

1. A method for obtaining a direction of elliptically polarized electromagnetic wave propagation by measuring electromagnetic wave field quantities, characterized by the steps of (a) arranging a group of receiver means for receiving the electromagnetic wave;

(b) arranging at least three antenna devices (5) for measurement of spatial components of a time-dependent electromagnetic vector field (f(t)), each antenna device connected to an individual receiver means forming a received spatial signal;

(c) digitizing the spatial signal formed by the receiver means;

(d) utilizing a discrete transformation algorithm which is applied to the wave-form data for obtaining spectrum field data, whereby each spatial component of a spectrum field (F(ω)) is separated into a real part (25) and an imaginary part (30) thereby forming an entity F(t) having six quantities;

(e) determining a vector (V) being parallel to the direction of wave propagation, by taking the cross product of said spectrum field (F(ω)) with its Hermite conjugate F'(ω)) times the imaginary unit i, whereby, in a Cartesian base, the three components of the vector (V) are given by in pairs multiplying (40) said six quantities and summing (45) the products.

2. The method according to claim 1, characterized in that step (c) further comprises the step of analog down-conversion ahead of said step of digitizing.

3. The method according to claim 1, characterized in that step (c) further comprises the step of digital down-conversion after said step of digitizing.

4. The method according to claim 1, characterized in that step (c) further comprises the step of spatial orthogonalization after said step of digitizing.

5. The method according to claim 1, characterized in that step (e) further comprises the step of determining a spectral intensity (I) by squaring (60) each of said six quantities and summing (65) the products.

6. A system for obtaining a direction of elliptically polarized electromagnetic wave propagation by measuring electromagnetic wave field characterization, characterized by a group of receiver means for receiving an electromagnetic wave;

at least three antenna devices (5) for measuring spatial components of a time-dependent electromagnetic vector field (f(t)) representing the electro-magnetic wave, each antenna device being connected to an individual receiver means to thereby form a received spatial signal, analog-to-digital converters (ADC) performing a digitizing of the spatial signals formed at each receiver means, means for performing a discrete transformation algorithm (WFT) being applied to the wave-form data for obtaining spectrum field data, whereby each component of said spectrum field (F(ω)) is separated into a real part (25) and an imaginary part (30) thereby forming an entity having six quantities, means determining a vector (V) parallel to the direction of wave propagation, by taking the cross product of said spectrum field (F(ω)) with its Hermite conjugate (F'(ω)) times the imaginary unit i, whereby, in a Cartesian base, the three components of said vector (V) are given by multiplying (40) in pairs said six quantities and summing (45) the products.

7. The system according to claim 6, characterized by having analog down-conversion means (DC) in front of the analog-to digital converters (ADC).

8. The system according to claim 6, characterized by including a process for digital down-conversion of signals to baseband frequencies by utilizing digitized data after the analog-to digital converters (ADC).

9. The system according to claim 6, characterized by including a process for spatial orthogonalization of waveform data after the Analogue-to-Digital Converters (ADC).

10. The system according to claim 6, characterized by means for calculating a spectral intensity (I) from said spectrum field by performing a squaring (60) and then a summing (65) of said six quantities.

* * * * *